US006120062A

United States Patent [19]

Revill

[11] Patent Number: 6,120,062

[45] Date of Patent: Sep. 19, 2000

[54] COATED PLASTIC RECEIPT

[75] Inventor: Morten Revill, Oslo, Norway

[73] Assignee: Admedia AS, Oslo, Norway

[21] Appl. No.: 09/065,918

[22] Filed: Apr. 24, 1998

Related U.S. Application Data

[63] Continuation-in-part of application No. 09/043,429, filed as application No. PCT/NO97/00351, Dec. 23, 1997, abandoned.

[51] Int. Cl.[7] .............................. B42D 15/00; B32B 5/16; B32B 27/00

[52] U.S. Cl. ......................... 283/60.1; 428/323; 428/337; 428/341; 428/411.1; 428/500; 428/908; 427/322

[58] Field of Search ............................... 428/35.7, 411.1, 428/500, 507, 520, 908, 43, 323, 325, 332, 340, 341; 283/30, 60.1; 902/36; 427/299, 307, 322

[56] References Cited

U.S. PATENT DOCUMENTS

| | | | |
|---|---|---|---|
| 4,365,002 | 12/1982 | Takahashi | 428/483 |
| 4,526,847 | 7/1985 | Walker et al. | 430/18 |
| 4,612,721 | 9/1986 | Fumei | 40/310 |
| 5,054,349 | 10/1991 | Vuillaume | 83/177 |
| 5,209,513 | 5/1993 | Batelli et al. | 283/67 |
| 5,229,218 | 7/1993 | Dobreski | 428/516 |
| 5,336,541 | 8/1994 | Kobayashi | 428/40 |
| 5,448,282 | 9/1995 | Imai et al. | 347/213 |
| 5,464,254 | 11/1995 | Campbell et al. | 283/109 |
| 5,478,279 | 12/1995 | McCormick | 462/25 |
| 5,586,787 | 12/1996 | Brown et al. | 283/67 |
| 5,776,604 | 7/1998 | Lu et al. | 428/343 |
| 5,782,496 | 7/1998 | Casper et al. | 283/81 |
| 5,819,665 | 10/1998 | McCormick | 101/483 |
| 5,824,379 | 10/1998 | Riley et al. | 428/40.1 |
| 5,856,010 | 1/1999 | Furuya et al. | 428/407 |

FOREIGN PATENT DOCUMENTS

| | | |
|---|---|---|
| 623452A2 | 11/1994 | European Pat. Off. . |
| WO9816378A1 | 4/1998 | WIPO . |

*Primary Examiner*—Paul Thibodeau
*Assistant Examiner*—Sheeba Ahmed
*Attorney, Agent, or Firm*—Niro, Scavone, Haller & Niro

[57] ABSTRACT

A sales receipt for displaying transaction and/or advertising indicia. The sales receipt consists of a coated plastic film with one or more layers. The surfaces of the plastic film may be treated and coated so that they can be provided with printed characters that will not smudge or smear.

13 Claims, 2 Drawing Sheets

COATED PLASTIC RECEIPT

This application is a continuation-in-part of U.S. Ser. No. 09/043,429, filed Mar. 19, 1998, now abandoned, and titled "Sales Receipt for a Cash Register, Etc.", which claims 371 of International Application No. PCT/NO97/00351, filed Dec. 23, 1997, which in turn claims priority from Norwegian Patent Application Nos. P981437 filed Aug. 18, 1997 and P970250, filed Jan. 20, 1997.

BACKGROUND OF THE INVENTION

The present invention generally relates to a coated plastic receipt and, more specifically, to a coated plastic receipt which may be used to display transaction and/or advertising indicia in a variety of applications, including as cash register rolls, ATM rolls, tickets, coupons and other applications involving the use of printed transaction materials.

Sales receipts have traditionally consisted of paper. See, e.g., U.S. Pat. No. 5,209,513 to Batelli, which discloses a paper receipt with pre-printed UV print capable of receiving transaction indicia. However, there are certain disadvantages associated with paper receipts. For example, paper receipts contain fibers that give off dust when used with machinery, requiring maintenance costs to control this dusting effect. Also, paper receipts are highly ink-absorbent, so that during manufacture and use they consume relatively large amounts of ink/color ribbon as compared to plastic film. Further, paper receipts are not durable and, when exposed to water, tend to tear or disintegrate. Plastic receipt rolls are also quieter than paper in operation. Still further, paper receipts are relatively thick as compared to plastic receipts, increasing storage costs and freight and roll changeover frequency, for example, and hence the costs of using them. Also, paper fibers are not as translucent as plastic film, and there is a potential for a better print quality on plastic film than on paper, both of which contribute to a more attractive advertising medium.

For these reasons, plastic receipts are a more attractive transactional and advertising medium. However, conventional plastic receipts have certain disadvantages which have no doubt prevented their widespread use. For example, they are not capable of retaining transaction indicia in a satisfactory manner. While ink printing can be accomplished on the surface of such receipts, the print will easily smear or can be erased. Thermal printing on conventional plastic receipts will not work at all. U.S. Pat. No. 5,229,218 to Dobreski, for example, discloses a plastic receipt but fails to disclose how printing can be accomplished on such a receipt.

Conventional plastic receipts also have a very smooth surface which provides poor traction when fed through printers or other machinery. This can result in an unreliable product, both in the process of manufacturing small rolls from larger rolls, as well as in use of the rolls during a transaction (when downtime and maintenance costs are particularly high).

Conventional plastic receipts also become easily electrically charged, especially when rubbed against printer parts, etc., which can cause them to become unreliable in use. This may be the case even if they are specifically prepared against static electricity, since contact with expensive and sensitive equipment is commonplace and friction and heat can develop in printers, etc., which can easily charge plastic material. A further disadvantage of conventional plastic receipts is that, in the past, plastic receipts have been "treated" sufficiently (i.e., a well known chemical treatment which provides enough tension on the plastic surface so that it can be printed on) on only one side or not at all.

Accordingly, it is an object of the present invention to provide a coated plastic receipt capable of bearing printed transaction indicia which is superior to conventional paper receipts (given the advantages of plastic receipts mentioned above) and that overcomes the disadvantages mentioned above that are associated with conventional plastic receipts.

Another object of the invention is to provide an aesthetically pleasing sales receipt, of higher quality and improved physical appearance, so that the customer receives an enhanced transaction document. It is envisioned that the coated plastic receipt of the present invention will serve as a contemporary advertising medium appropriate for use in various locations such as transaction outlets, suppliers of goods/services, public information, etc.

A further object is to provide a sales receipt which can be used without detrimental impact on the environment.

SUMMARY OF THE INVENTION

These and other objectives are achieved by the sales receipt of the present invention. Sales receipt of the present invention overcome disadvantages with prior art sales receipts, as mentioned above. In addition, the present invention provides new advantages not found with prior art sales receipts, whether made of paper or plastic.

The present invention concerns a coated plastic receipt used as a transaction and/or advertising medium. The coated plastic receipt of the present invention is capable of receiving, displaying and securely retaining purchase details, and improving the overall quality of the receipt.

As will be understood from the description of the invention provided below, the present invention provides several advantages not found in the prior art. Ink/color ribbon consumption is lower than with paper receipts. Also, since plastic receipts have properties such as a higher tensile strength relative to paper receipts, they can be made much thinner than paper, allowing the production of a coated plastic receipt roll which is one-half (or less) than the thickness of a paper receipt roll of the same length. Put another way, a coated plastic receipt roll of the present invention and of the same diameter as a paper receipt roll may be twice its length or more.

The special coating described below provides a plastic receipt with good traction and reduced static electricity, even during use. Absorbency is also sufficiently high so that transaction indicia are clearly printed, without significant smudging or smearing. Since the plastic receipts of the present invention are preferably treated on both sides of the receipt, and may be coated on at least one side (in a preferred embodiment) or both sides of the receipt, information such as advertising and/or print can be provided on one or both sides, if desired. Further, the coated plastic receipts described here may be provided with varying degrees of translucency, so that (e.g.) advertising printed on a bottom surface of the receipt may be viewed when looking at the top surface of the receipt.

In a preferred embodiment, a sales receipt is provided which is suitable for receiving and displaying transaction and/or advertising indicia. The sales receipt includes at least one layer of a plastic film having a top surface and a bottom surface. One or more coatings are applied to at least one surface of the plastic film. The coating is capable of receiving printed characters in a manner that will permit the characters to quickly dry and adhere to the coating without significant smudging or smearing.

In one embodiment, at least two layers of plastic film are provided. Each of the layers have a surface which is first chemically treated and to which the coating is then applied.

In a particularly preferred embodiment, a single layer of plastic film is used, and both top and bottom surfaces of the plastic film are treated. A coating is applied to one of those surfaces, such as the top surface. Advertising information may now be placed on the bottom surface of the treated plastic film, and transaction indicia may be printed on the top surface of the treated and coated plastic film.

The coated plastic film is preferably translucent. In one preferred embodiment, the top and bottom surfaces of the coated plastic film have varying degrees of translucency. Prior to application of the coating, either one or both of the top and bottom surfaces of the plastic film may be made transparent.

The printed characters may consist of ink, ribbon, laser, thermal, or other print characters.

One preferred embodiment of the plastic film is a single-ply, coextruded bi-oriented polypropylene film. The plastic film may be made essentially from a polypropylene resin. Titanium dioxide whiteners may be added to the film, in the range of about 2%–4% by weight. The plastic film may have a friction coefficient of about 0.28, as measured by the Davenport method. Preferably, the plastic film has a thickness of equal to or less than about 50 microns.

The coating may consist of China clay or similar products with a nitrocellulose bonding system. Alternatively, the coating may consist of an solvent-based coating made from substances from the following group: nitrocellulose, ethanol, N-propanol, ethylacetate N propylacetate or synthetic resin. The coating preferably has a friction coefficient greater than about 0.60, as measured by the Davenport method.

The absorption factor of the coating is preferably at least 10 times that of the plastic film and, more preferably, at least 20 times that of the film.

In an alternative embodiment, the plastic coated sales receipt of the present invention may be manufactured with other like sales receipts in a roll, with the sales receipts being linked by perforations which facilitate the detachment of individual sales receipts.

A process for forming a plastic sales receipt capable of receiving and displaying transaction and/or advertising indicia also forms part of the present invention. In this process, at least one layer of a plastic film having top and bottom surfaces is provided. One or both surfaces of the plastic film is first chemically treated to at least 38 dynes/centimeter, and then a coating is provided to either one or both of the surfaces. The coating is capable of receiving printed characters. The coating has a composition and is applied (e.g., by way of a typical flexo unit) in such a manner that will permit the printed characters to quickly dry and adhere to the coating without smudging or smearing of the printed characters during subsequent use of the sales receipt. In one preferred embodiment, advertising information is printed on the bottom surface of the coated plastic receipt, and transaction indicia is printed on the top surface of the coated plastic receipt. The coated plastic receipt may also be provided with varying degrees of translucency, such as by varying the amount of titanium dioxide added to the film.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF PREFERRED EMBODIMENTS

Figure 1:
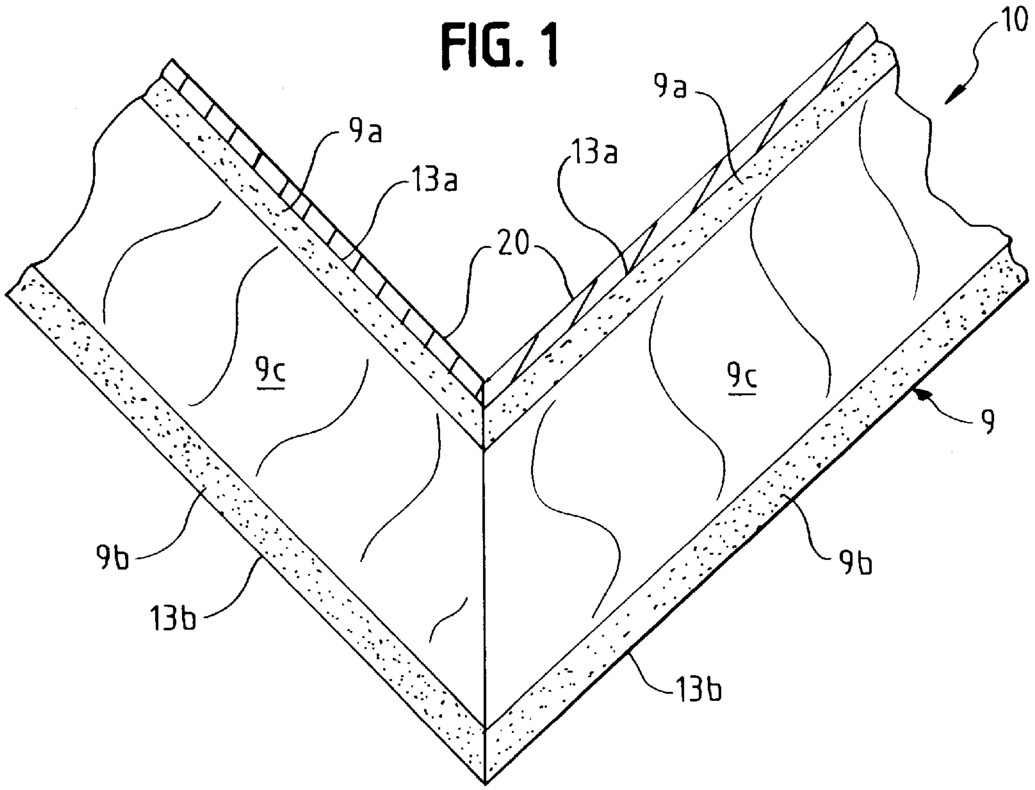
FIG. 1 is a schematic view, in partial cross-section, of one preferred embodiment of a multiple layer, single-ply plastic film used with the present invention.

In a preferred embodiment of the present invention, a plastic receipt is designated generally as 10. Plastic receipt 10 may consist of a multiple-layer single ply (1-ply) film 9, as shown in FIG. 1, which has top and bottom surfaces 9*a* and 9*b*. Layers 9*a* and 9*b* are surface layers of the single-ply film, which can be made by standard industrial film manufacturing processes. Top layer 9*a* has a surface 13*a* and bottom layer 9*b* has a surface 13*b*. Layers 9*a*, 9*b* may each be chemically treated, and may be sealed to a core layer 9*c*. In a particularly preferred embodiment, one or more layers of a coating 20 (described below) is applied to treated top surface 9*a* of the plastic film.

Alternatively, plastic receipt 10 may consist of a mono-layer single ply (1-ply) film. In another alternative embodiment, plastic receipt 10 may consist of a two-ply (2-ply) film, with each ply consisting of one or multiple layers. If a 2-ply film is used, two separate plastic film layers may be employed, which stick together by means of friction.

In one preferred embodiment, printed information (e.g., advertising) may be provided on surface 13*b* while other printed information (e.g., a store logo) may be provided on surface 13*a* (the same surface where transaction indicia may also be provided). Since top layer 9*a* can be made substantially transparent as explained below, advertising printed on surface 13*b* of bottom layer 9*b* can be seen when viewing surface 13*a* of top layer 9*a*, for example.

In a preferred embodiment, plastic film 9 is composed of a coextruded bi-oriented polypropylene film, consisting of polypropylene resin and well known additives such as whiteners (e.g., titanium dioxide), standard anti-slip and anti-static agents, etc. An ink-absorbing coating may be applied to the plastic film as described below.

The amount of $T_iO2$ applied to film 9 may be varied so that layers 9*a* and 9*b* may be made transparent or with varying degrees of translucency. This allows advertising information on bottom surface 9*b* to be seen through the receipt, for example. In one preferred embodiment, film 9 includes titanium dioxide in a range of about 2%–4% by weight.

A preferred embodiment of plastic film 9 is available from Moplefan (Montell) of Liege, Belgium, and is known as "Moplefan OHCT/W", and is a white, opaque cavitated coextruded film. "Moplefan OHCT/X" may also be used. The technical specifications for this film are shown below in TABLE 1:

TABLE 1

| Properties | Unit | Typical Values | Test Method |
|---|---|---|---|
| Tensile strength: | N/mm$^2$ | | ASTM D 882 |
| MD (Machine Direction) | | 75 | DIN 53455 |
| TD (Transverse Direction) | | 200 | |
| Elongation at break: | % | | ASTM D 882 |
| MD | | 130 | DIN 53455 |
| TD | | 35 | |
| Coefficient of friction | — | 0.40 | ASTM D 1894 |
| film/film | | | DIN 53375 |
| WVTR | g/m$^2$.24 h | 5.50 | ASTM E 96 |
| Thickness 40μ | | | 38° C. - 90% U.R. |
| Oxygen permeability | cm$^3$/m$^2$.24 h.atm | 1300 | ASTM D 1434 |
| Thickness 40μ | | | 25° C. - 0% U.R. |
| Opacity | % | 78 | MACBETH TD 931 |
| Thickness 40μ | | | |
| Meat seal range | ° C. | 120/140 | Moplefan A 29 |
| Seal strength | g/cm | ≧120 | OPMA |
| Thickness 40μ | | | |
| Treatment level | dine/cm | ≧38 | ASTM D 2578 |

A particularly preferred embodiment of plastic film 9 is also available from Moplefan, and is known as "ADM-01". The ADM film, shown schematically in FIG. 1, is a 1-ply film which consists of two-heat-sealable (top and bottom) layers 9*a,* 9*b,* with a core layer 9*c* essentially consisting of polypropylene resin. The friction coefficient of the ADM-01 film is about 0.28, as measured by the Davenport method. The technical specifications for the ADM-01 film are shown below in TABLE 2:

TABLE 2

| PROPERTIES | | UNITS | ADM-01 | METHOD |
|---|---|---|---|---|
| | | Both side treated | | |
| Thickness | | μ | 40 | |
| Surface treatment | | dyne/cm | 38 | ASTM 2578 |
| Weight/unit | | g/m$^2$ | 28.8 | ASTM D2673 |
| Yield | | m$^2$/kg | 34.7 | ASTM D2673 |
| Opacity | | % | 75 | ASTM D1003 |
| COF (DYN) | F/F Outside | | 0.51 | ASTM D1894 |
| | F/F Inside | | 0.50 | |
| COF (DYN) | F/metal outside | | 0.26 | |
| | F/metal inside | | 0.25 | |
| Tensile | M.D | N/mm$^2$ | 120 | ASTM D882 |
| Strength | T.D | | 300 | |
| Elongation at | M.D | % | 190 | |
| Break | T.D | | 45 | |
| Modulus of | M.D | N/mm$^2$ | 1200 | |
| Elasticity | T.D | | 2500 | |
| Shrinkage | M.D | % | 5 | OPMA TC4(a) |
| | T.D | | 2.5 | |
| Heat seal Strength | | gr/cm | 180 | OPMA |
| Heat seal range | | ° C. | 120–140 | MOPLEFAN A.29 |
| WVTR | 38° C./90% HR | g/m$^2$, 24 h | 4.4 | ASTM F1249 |
| OTR | cm$^3$/fm$^2$, 24 h.atm | 23° C./70% HR | 1490 | DIN 5380 |
| Density | | | 0.72 | |

The ADM film has a negligible absorption factor compared to the coating (delta value 20). In other words, coating 20 preferably has an absorption factor of at least about 20 times that of the film. It has been found that absorption differentials of this magnitude permit ink transmitted from a printer to be immediately absorbed and dried so that when the customer receives the plastic receipt, the print is dry and does not smudge or smear in a significant manner. As used here, "significant" means that the coating is sufficiently smudge-proof and smear-proof such that it will not interfere with the ability to use the receipt or with the customer's perception that the receipt is a quality product and an attractive informational medium. While 20 is the absorption differential for the preferred embodiment, in practice, an absorption factor of at least about delta value 10 is required (i.e., the coating should have an absorption factor of at least about 10 times that of the film) and intermediate delta values between 10 and 20 may be preferred for a given application. When a sufficiently high delta value is used (e.g., 20), should plastic receipt 10 of the present invention be placed in a washing machine, the printed transaction indicia will not smear or be erased.

As mentioned above, the use of plastic film 9 provides a thinner receipt than if paper were used. A 1-ply coated plastic film according to the present invention may preferably have a thickness in the range of between about 40–50 microns, but probably not less than about 28 microns, given existing materials. If a 2-ply roll having two separate coated plastic film layers is used, each layer might have a thickness of no less than about 20 microns, again given existing materials.

Coating 20 may consist of China clay or similar products with a nitrocellulose bonding system. The coating may also consist of an solvent-based coating made from substances from the following group: nitrocellulose, ethanol, N-propanol, ethylacetate N propylacetate or synthetic resin. A suitable coating 20 developed especially for use in cash register receipt applications is absorption coating No. 19852 manufactured by Coates Lorrilleaux Group of Paris, France (through its Oslo, Norway office). The friction coefficient of the No. 19852 coating is about 0.60–0.64, as measured by the Davenport method. Coating 20 may include any of a variety of standard anti-static substances well known to those of ordinary skill in the art. The incorporation of such anti-static substances into the coating has proven more reliable than treating conventional plastic receipts against static electricity.

Figure 2A:
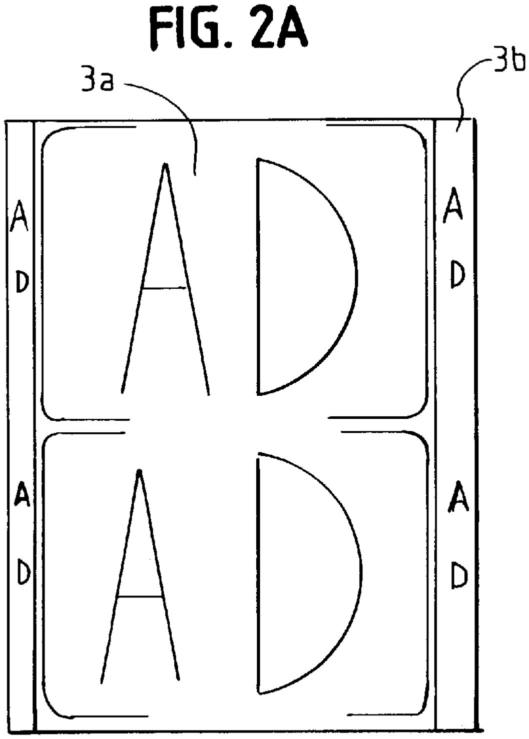
FIGS. 2A and 2B are front and rear views, respectively, of the sales receipt of FIG. 1.
Figure 2B:
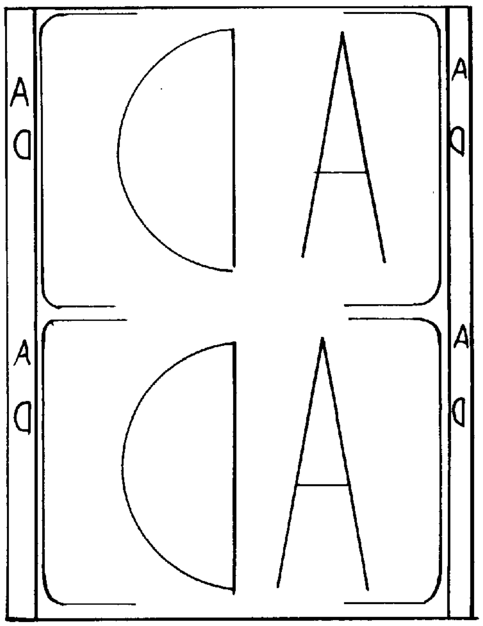

Referring to FIG. 2, sales receipt 10 is shown from the front (FIG. 2A) and from the rear (FIG. 2B). Areas 3*a* and 3*b* are two different predefined areas where, according to the present invention, printed information such as advertising (exemplied by the letters "AD") may be provided. Of course, since the entire surface areas of layers 9*a* and 9*b* may be treated and coated as explained below, transaction indicia or advertising information may be applied anywhere on surfaces 13*a* and 13*b*. (As a general matter, treating a surface is necessary to apply advertising information on it, but a surface need not be coated for this purpose; instead, a surface need only be both chemically treated and coated if transaction indicia, for example, is to be printed on that surface.)

Thus, according to the present invention, various printed information, such as purchase or other transaction details and/or advertising information, may be printed on the top and/or bottom layers such that printing and coating is possible over the entire surfaces 13*a*, 13*b*. It is possible, however, to coat only the regions of surfaces 13*a* and 13*b* where transaction indicia or other information are likely to be located. This will leave a margin on each roll which would be uncoated, and could be done to save coating costs, for example.

A coating 20 may be applied to both top surface 13*a* of top layer 9*a* and bottom surface 13*b* of bottom layer 9*b* although, in the preferred embodiment, coating 20 is applied only to surface 13*a* of top layer 9*a* since this is where transaction indicia is likely to be printed. Transaction indicia is printed on coating 20 so that they are absorbed, dried and retained by coating 20 and remain unsmeared and clearly readable to a consumer.

By using the present invention, stores will have the opportunity to have their own information (e.g., store logos) printed in a separate area on the receipt, thereby providing the store with a more aesthetic representation for it. Consequently, the store and its suppliers will become associated with each other by virtue of the sales receipt of the present invention which, over time, is viewed as providing a beneficial result to both the store and its suppliers of goods or services.

Coated plastic receipt 10 is also environmentally friendly. If combusted, about 90% of its mass transforms into carbon dioxide and water vapor, while the remainder is a chemically inert, harmless residue. The receipt is also readily recyclable using a low energy requirement, and can be re-extruded (i.e., it is reusable). Thus, users of receipt 10 will become associated with these beneficial results, as well.

Figure 3:
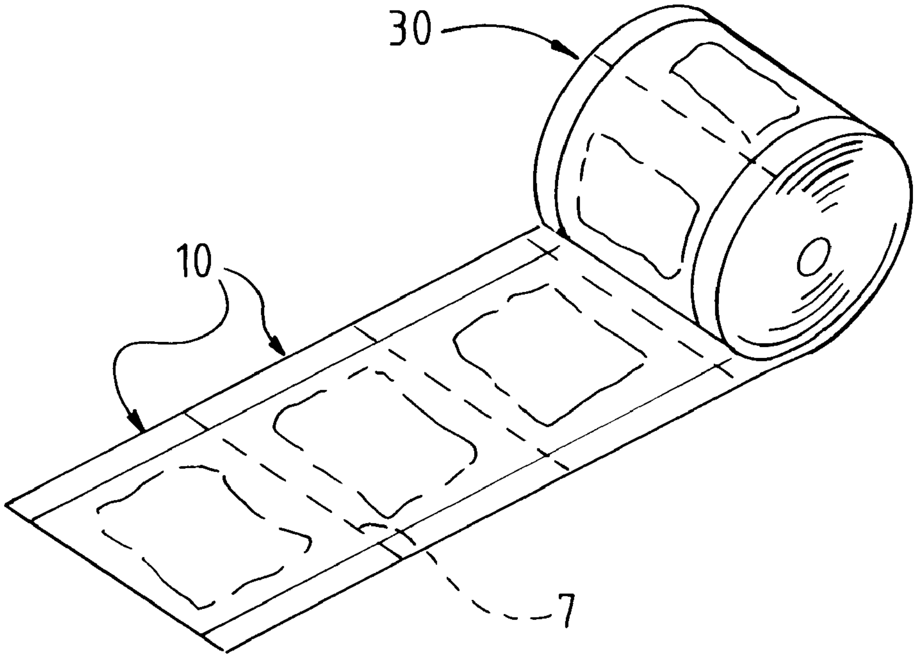
FIG. 3 is a side perspective view of the sales receipt of FIG. 1 in a roll format.
Figure 4:
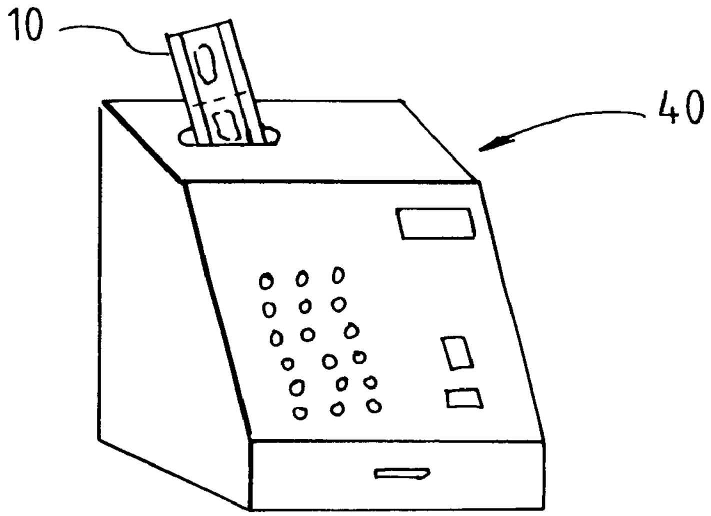
FIG. 4 is a perspective view of the sales receipt of the present invention as used with a cash register.

Referring to an alternative embodiment shown in FIG. 3, sales receipts 10 may be manufactured in an unseparated form with suitable broken lines or perforations 7, evenly distributed on roll 30, so that the receipts may be more easily separated from the roll. This will also help ensure that every customer receives the entire advertising/informational message, and not just a partial message. The actual transaction indicia may then be printed, as normal, as the plastic roll is fed through cash register 40 (see FIG. 4).

In yet another embodiment (not shown in the drawings), plastic receipts 10 may be provided in an unseparated format (such as a in a pile or stack as opposed to a roll), for use as (e.g.) parking ticket dispensers.

An additional advantage of the present invention is that coating 20 has been found to provide sufficient traction to the sales receipt rolls so as to facilitate their feeding through machinery.

Coating 20 of the present invention is manufactured separately and added to the film in the process of making cash register rolls, ATM rolls, tickets, coupons, etc. Coating 20 as well as advertising print (e.g., flexo inks) may be applied to the plastic film using a typical flexo unit as will be understood by those of ordinary skill in the art. Appropriate printing stations of a sufficient number should be used so that advertising may be printed in multiple colors. (If four printing stations are used, for example, three colors are available, with one station being used for the coating.)

Rollers may be used to apply coating 20. Less advertising ink volume is needed for plastic as compared to paper due to the lower absorbency rate of plastic film. Therefore, the rollers used should be made for printing on plastic, and should lay down the required amount of coating and/or color inks per square meter. In one preferred (exemplary) embodiment, a roller was used which applied 7 grams/meter$^2$ of "wet coating". In this embodiment, the coating amount in dry weight on the film (on the finished receipt) was 2.9–3.0 grams/meter$^2$. Of course, the coating amount may vary given the application. Also, a sufficient drying apparatus should be employed, such as an ultraviolet or hot air apparatus.

Depending on the type of printer, dispenser, etc. used, the composition of coating(s) 20 for plastic receipts 10 may need to be modified. For thermal applications, a traditional thermal coating as used with paper receipts may be used. The absorbency factor required for particular types of printers (e.g., ink ribbons), or the amount of coating 20 that must be applied, may also need to be varied, in a manner which will be understood by a person of ordinary skill in the art upon reading this disclosure. Further, as will also be understood, while certain coatings may have the same general characteristics, they differ in chemical composition in that some are water-based while others are alcohol-based, and the selection of one or the other may be desirable depending upon the application (e.g., it may be more desirable to use water-based coatings for environmental applications).

It will be understood that plastic receipts 10 of the present invention may be used with a variety of transaction media. For example, a non-exhaustive list includes: automatic teller machines (ATMs), cash register printers, POS card terminals, ticketing printers, coupon dispensers and queue ticket dispensers. Various printing applications may be employed with plastic receipts 10 of the present invention, including bond (dot matrix or impact) printing, ink jet, laser, thermal-type, or other printing applications.

Exemplary embodiments of the present invention have been described. It will be understood that these examples are not intended as exhaustive or limiting, and the broad scope of the present invention is intended to be described, rather, by reference to the following claims.

I claim:

1. A coated plastic sales receipt suitable for receiving and displaying transaction and/or advertising indica, comprising:

at least one layer of a plastic film having a top surface and a bottom surface, at least one of the top and bottom surface of the plastic film being chemically treated; and one or more coatings applied to at least one treated surface of the plastic film, the one or more coatings being capable of receiving printed characters in a manner that will permit the characters to quickly dry and adhere to the one or more coatings without significant smudging or smearing, wherein the one or more coatings comprise a binder and China clay and have an absorption factor that is at least ten times greater than that of the plastic film, the coating amount in dry weight on the film is greater than or equal to about 2.9 grams/meter$^2$ and the printed characters are received on at least one of the coated surfaces of the plastic film using an ink or a thermal printer.

2. A coated plastic sales receipt suitable for receiving and displaying transaction and/or advertising indica, comprising:

at least one layer of a plastic film having a top surface and a bottom surface, at least one of the top and bottom surfaces of the plastic film being chemically treated and wherein the plastic film has a thickness of equal to or less than about 50 microns; and one or more coatings applied to at least one treated surface of the plastic film, the one or more coatings being capable of receiving printed characters in a manner that will permit the characters to quickly dry and adhere to the one or more coatings without significant smudging or smearing, wherein the one or more coatings comprise a binder and China clay and have an absorption factor that is at least ten times greater than that of the plastic film, and the printed characters are received on at least one of the coated surfaces of the plastic film using an ink or a thermal printer.

3. A coated plastic sales receipt suitable for receiving and displaying transaction and/or advertising indica, comprising:

at least one layer of a plastic film having a top surface and a bottom surface, at least one of the top and bottom surfaces of the plastic film being chemically treated; and one or more coatings applied to at least one treated surface of the plastic film, the one or more coatings being capable of receiving printed characters in a manner that will permit the characters to quickly dry and adhere to the one or more coatings without significant smudging or smearing, wherein the one or more coatings comprise a binder and China clay and have an absorption factor that is at least twenty times greater than that of the plastic film, and the printed characters are received on at least one of the coated surfaces of the plastic film using an ink or a thermal printer.

4. A coated plastic sales receipt suitable for receiving and displaying transaction and/or advertising indica, comprising:

at least one layer of a plastic film having a top surface and a bottom surface, at least one of the top and bottom surfaces of the plastic film being chemically treated; and one or more coatings applied to at least one treated surface of the plastic film, the one or more coatings being capable of receiving printed characters in a manner that will permit the characters to quickly dry and adhere to the one or more coatings without significant smudging or smearing and wherein the one or more coatings comprise nitrocellulose binder and China clay and have an absorption factor that is at least ten times greater than that of the plastic film, and the printed characters are received on at least one of the coated surfaces of the plastic film using an ink or a thermal printer.

5. A coated plastic sales receipt suitable for receiving and displaying transaction and/or advertising indica, comprising:

at least one layer of a plastic film having a top surface and a bottom surface, at least one of the top and bottom surfaces of the plastic film being surface treated to at least 38 dynes/centimeter;

one or more coatings applied to at least one treated surface of the plastic film, the one or more coatings being capable of receiving printed characters in a manner that will permit the characters to quickly dry and adhere to the one or more coatings without significant smudging or smearing, wherein the one or more coatings comprise nitrocellulose binder and China clay and have an absorption factor that is at least ten times greater than that of the plastic film, and the printed characters are received on at least one of the coated surfaces of the plastic film using an ink or a thermal printer.

6. A coated plastic sales receipt suitable for receiving and displaying transaction and/or advertising indica, comprising:

at least one layer of a plastic film having a top surface and a bottom surface, at least one of the top and bottom surfaces of the plastic film being chemically treated; and one or more coatings applied to at least one treated surface of the plastic film, the one or more coatings being capable of receiving printed characters in a manner that will permit the characters to quickly dry and adhere to the one or more coatings without significant smudging or smearing, wherein the one or more coatings comprise nitrocellulose binder and China clay and have an absorption factor that is at least ten times greater than that of the plastic film, the one or more coatings have a friction coefficient of greater than about 0.60 as measured by the Davenport method, and the printed characters are received on at least one of the coated surfaces of the plastic film using an ink or a thermal printer.

7. The coated plastic sales receipt of claim 5, wherein the at least one layer of the plastic film includes titanium dioxide in a range of about 2–4%, by weight.

8. The coated plastic sales receipt of claim 5, wherein the plastic film comprises a polypropylene film.

9. The coated plastic sales receipt of claim 5, wherein the plastic film comprises a coextruded bi-oriented polypropylene film.

10. A process for forming a coated plastic sales receipt capable of receiving and displaying transaction and/or advertising indica, comprising the steps of:

providing at least one layer of a plastic film having a top and bottom surface;

chemically treating at least one of the top and bottom surfaces of the plastic film;

applying a coating comprising a binder and China clay and having an absorption factor that is at least ten times greater than that of the plastic film, to the chemically treated plastic film;

the one or more coatings being capable of receiving printed characters in a manner that will permit the printed characters to quickly dry and adhere to the one or more coatings without significant smudging or smearing and wherein the printed characters are received on at least one of the coated surfaces of the plastic film using an ink or a thermal printer.

11. The process of claim 10, further comprising the step of printing advertising information on the bottom surface of the coated plastic film and printing transaction indica on the top surface of the coated plastic film.

12. The process of claim 10, further comprising the step of adding a whitener to the at least one layer of the plastic film prior to coating and thereby rendering the plastic film translucent.

13. The process of claim 12, wherein the whitener comprises titanium dioxide.

* * * * *